Patented Apr. 21, 1931

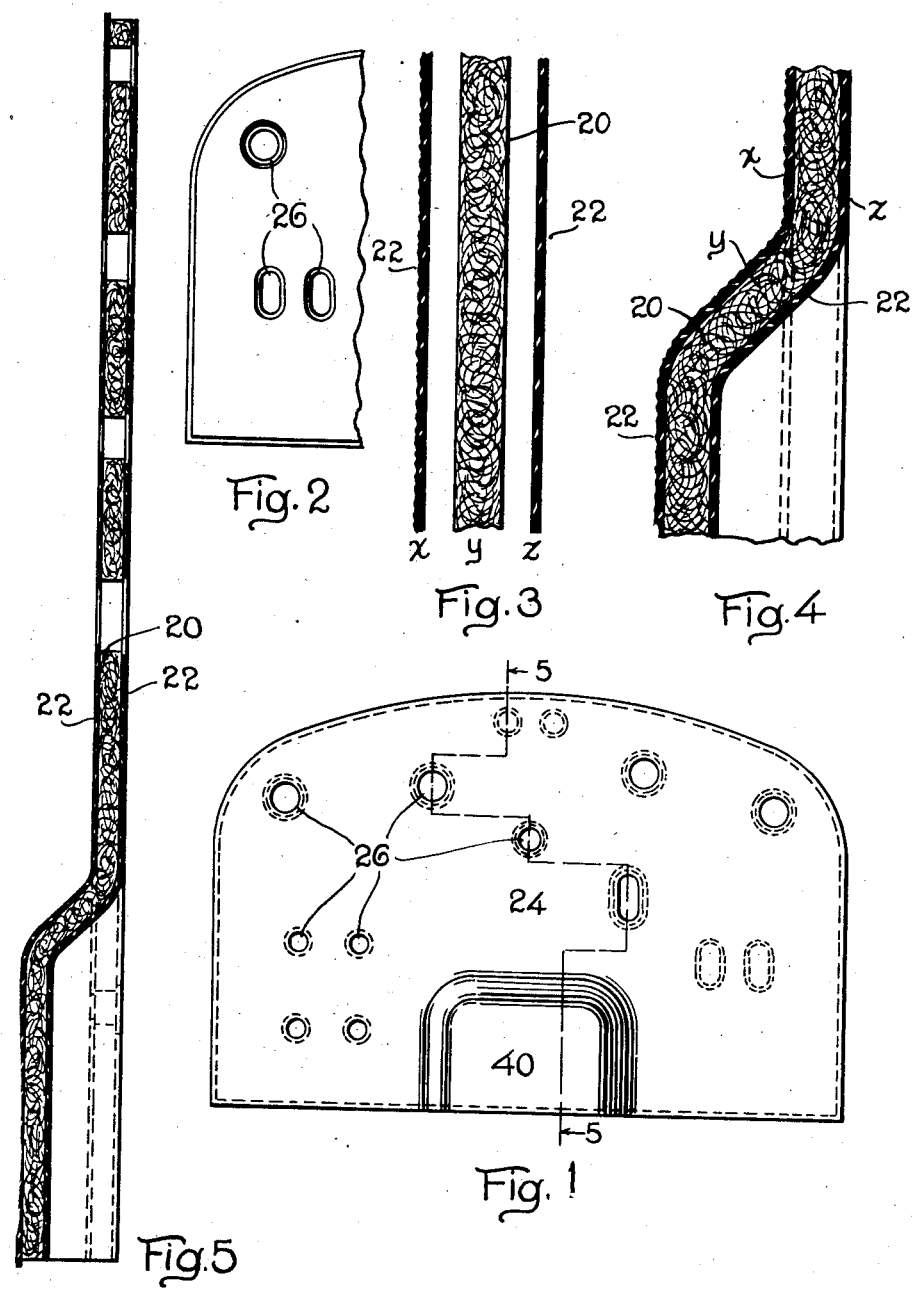

1,801,786

UNITED STATES PATENT OFFICE

HERBERT J. WOODALL AND MEREDITH S. RANDALL, OF DETROIT, MICHIGAN, ASSIGNORS TO WOODALL INDUSTRIES INCORPORATED, OF DETROIT, MICHIGAN, A CORPORATION OF MICHIGAN

AUTOMOBILE DASH PANEL

Application filed November 18, 1927. Serial No. 234,072.

Our invention relates to an improved panel and particularly to an improved dash panel for an automobile.

Metal plates have heretofore been used for this purpose but metal being a good conductor of both heat and sound served only too well to communicate the heat and sound of the engine to the interior of the body. Wood has also been used but while not a good conductor of heat and sound it failed to properly insulate against it and it was thick, heavy, and expensive. Both wood and metal required an outer finish.

Our improved panel is light, durable, strong, inexpensive, and possesses unusually high insulating properties as against heat and sound.

While possessing high insulating properties, it is nevertheless capable of being bent and shaped as desired and has a required rugged stability necessary for the purpose for which it is intended to be employed. It is capable of being stamped or embossed to give to it a finish suitable for the interior of an automobile body.

These and other desirable characteristics will more fully appear from the following description, appended claims and accompanying drawing, wherein:

Fig. 1 is a front elevation of an automobile dash panel embodying our invention.

Fig. 2 is a rear elevation of a fragment of the panel shown in Fig. 1.

Fig. 3 is a sectional view through the layers of material used to form our panel.

Fig. 4 is a similar sectional view through the completed panel bent to form a recess therein.

Fig. 5 is a sectional view taken on line 5—5 of Fig. 1.

This improved panel has a core 20 formed of loosely integrated cellular fibres, having innumerable air spaces therebetween, and because of the cellular character and loosely matted nature of the fibres it is fragile, normally resiliently compressible, practically inflexible without rupture and sufficiently substantial to be self supporting against the disintegrating effect of wear, but possesses unusually high insulating properties as against heat and sound.

This core is provided with a tough, strong, flexible, reinforcing and protective outer layer 22, which supports and protects its loosely matted fibres binding them together and forming a strong, rugged panel structure. A composition fibre board carrying a substantial asphaltum content forms a suitable outer layer for the core. Such outer layer structure is closely compacted and is strong, rugged and durable. When subjected to slow pressure or heat and pressure it is flexible permitting bending and shaping thereof without rupture. It is capable of being embossed or stamped in a die whereby it may be given an outer finish suitable for the interior of an automobile body.

This outer layer may preferably be adhesively secured to the loosely matted core forming an integral structure therewith, incapable of being separated without destroying the panel. A preferred form of panel consists in the provision of such an outer layer upon each side of the core. It binds the loosely matted core fibres together and so holds them in place that the entire panel may be held to retain a bent or deformed shape.

The loosely integrated fragile cellular core structure furnishes the required insulation against heat and noise and the tough flexible closely compacted outer layers which possess relatively low insulating properties furnish the necessary strength, flexibility, protection and finish and permit the desired shaping of the panel structure.

While we do not wish to limit ourselves to any particular material as constituting the best or only available construction for our core member, we have found that a fabricated board produced from a long fiber pulp without the use of chemical processes to be extremely well adapted for our purpose.

For our purposes it is preferable that the core be constructed of a board manufactured entirely from wood fiber and which may be produced from clean wooden chips by the explosion thereof at high pressure. In this way the natural strength and wooden composition of the core is maintained while at the same time the high degree of insulating value both as to heat and to sound is incorporated in its physical characteristics. A very considerable amount of rigidity is maintained in a core so constructed, but the myriad of small air cells formed in and between the various fibers resulting from the wood chip explosion process provide the necessary insulating qualities. A fiber board very well adapted to the purposes described herein and substantially like the core structure described above is now marketed under the name of "Masonite."

Again we wish it understood that while we have described herein in some detail material which is admirably suited to the improved panel which constitutes the subject matter of our invention, various other structures may be utilized.

In Fig. 1 an automobile dash panel 24 of common form is shown in elevation. It is provided with a plurality of openings 26 for conduits, rods, wires, etc. These openings may preferably be enlarged on the rear side as shown in the fragmentary rear elevation of Fig. 2.

In Fig. 3 the core 20, with the loosely matted fibres which constitute it, are shown as separated from the two outer layers 22, which may preferably be formed of a closely compacted fibre board carrying a heavy asphaltum content. These outer layers are fastened to the core with a suitable adhesive and a structure so formed is shown in Fig. 4.

A panel of this character which possesses rigidity, substantial spring, and which comprises an integral complete structure adapts itself very readily to quick assembly due to the fact that it may be supported to be passed along the assembly line and when fastened in place it is entirely complete.

What we claim is:

1. An automobile dash panel comprising a loosely packed porous fibrous core possessing high heat and sound insulating properties and low wear resisting properties, which core is resiliently compressible but substantially inflexible and incapable of deformation without rupture, said core provided on both outer surfaces with outer layers of tough elastic flexible composition fiber material containing a substantial asphaltum content and possessing low insulating properties but great strength and durability and integrated with the core material binding the same together whereby the entire panel may be bent and shaped without being ruptured.

2. A panel having a core consisting of loosely matted cellular fibres characterized by being fragile, practically inflexible, resiliently compressible, and possessing high heat and sound insulating properties but low wear resisting properties, and a closely compacted fibre composition outer layer of thermoplastic sheet material secured upon one side of the core reinforcing and protecting the core, which outer layer contains a binder content securing its fibers together and possessing the characteristic of responding to heat and pressure to assume and permanently retain a deformed shape and to hold the core material to such shape.

3. A panel structure of the character described comprising, in combination, a core layer of loosely integrated fibrous material possessing high sound and heat insulating properties and low wear resisting properties and being substantially incapable alone of permanently retaining a deformed shape, and an outer layer permanently secured to said core layer forming in integral structure therewith, said outer layer comprising fibrous composition material carrying a substantial asphaltum content and possessing the characteristic of responding to heat and pressure to assume and permanently retain a deformed shape and to hold said core to said deformed shape.

4. A laminated panel structure of the character described, comprising, in combination, a core layer of loosely integrated fibrous material possessing high sound insulating properties, and an outer layer of closely compacted fibrous material carrying a heat responsive binder and possessing the characteristic of responding to heat and pressure to assume and permanently retain a deformed shape, said outer layer and core layer being permanently secured together whereby the core layer will be held to said deformed shape.

In testimony whereof, we sign this specification.

HERBERT J. WOODALL.
MEREDITH S. RANDALL.